(12) United States Patent
DeLizo et al.

(10) Patent No.: US 11,801,743 B2
(45) Date of Patent: *Oct. 31, 2023

(54) CONFIGURABLE, MODULAR VEHICLE ON COMMON CHASSIS PLATFORM, AND ASSOCIATED SYSTEMS AND METHODS

(71) Applicant: PACCAR Inc, Bellevue, WA (US)

(72) Inventors: Stanley W. DeLizo, Lynwood, WA (US); Gerald Jay Angelo, Bellevue, WA (US); Theodore Joseph Scherzinger, Sammamish, WA (US); Brian J. Lindgren, Kirkland, WA (US)

(73) Assignee: PACCAR Inc., Bellevue, WA (US)

( * ) Notice: Subject to any disclaimer, the term of this patent is extended or adjusted under 35 U.S.C. 154(b) by 259 days.

This patent is subject to a terminal disclaimer.

(21) Appl. No.: 17/031,520

(22) Filed: Sep. 24, 2020

(65) Prior Publication Data

US 2021/0001709 A1 Jan. 7, 2021

Related U.S. Application Data

(63) Continuation of application No. 16/141,675, filed on Sep. 25, 2018, now Pat. No. 10,792,992.

(51) Int. Cl.
*B60K 6/40* (2007.10)
*B60K 6/24* (2007.10)

(52) U.S. Cl.
CPC ............ *B60K 6/40* (2013.01); *B60K 6/24* (2013.01); *B60Y 2200/92* (2013.01); *B60Y 2304/00* (2013.01)

(58) Field of Classification Search
CPC ..... B60Y 2200/92; B60K 6/24; B62D 63/025
See application file for complete search history.

(56) References Cited

U.S. PATENT DOCUMENTS 9,145,048 B2 * 9/2015 King .................. B60K 6/48
10,300,831 B2 * 5/2019 Dziuba .............. B62D 59/04
(Continued)

FOREIGN PATENT DOCUMENTS

DE 102008059692 6/2010
DE 102009014860 10/2010

OTHER PUBLICATIONS

Australian Exam Report in Application 2016261354, dated Dec. 17, 2019, 6 pages.

(Continued)

*Primary Examiner* — Jason D Shanske
*Assistant Examiner* — James J Triggs
(74) *Attorney, Agent, or Firm* — Merchant & Gould P.C.

(57) ABSTRACT

A configurable, modular vehicle on common chassis platform, and associated systems and methods are disclosed herein. In one embodiment, a configurable modular vehicle includes: a chassis, a power plant module configured to generate electrical energy, and a drive train module. The drive train module includes: at least one traction motor configured to receive electrical energy from the power plant module, a transmission configured to transfer torque from the traction motor to a drive axle, and the drive axle configured to transfer torque to drive wheels, and a control system module configured to control components of the power plant module and the drive train module. The interfaces of the power plant module and the drive train module are predefined, and different types of the power plant modules and the drive train modules are interchangeable within their respective predefined interfaces.

20 Claims, 8 Drawing Sheets

(56) References Cited

U.S. PATENT DOCUMENTS

| | | | |
|---|---|---|---|
| 10,792,992 B2* | 10/2020 | DeLizo | B60K 6/24 |
| 2003/0116996 A1 | 6/2003 | Soja | |
| 2009/0101422 A1 | 4/2009 | Subramanian | |
| 2012/0303397 A1 | 11/2012 | Prosser | |

OTHER PUBLICATIONS

Brazil Office Action in Application 112017016985, dated Apr. 7, 2020, 3 pages.

* cited by examiner

CONFIGURABLE, MODULAR VEHICLE ON COMMON CHASSIS PLATFORM, AND ASSOCIATED SYSTEMS AND METHODS

CROSS-REFERENCE TO RELATED APPLICATIONS

This application is a continuation of U.S. patent application Ser. No. 16/141,675, filed Sep. 25, 2018. To the extent appropriate, the present application claims the benefit of priority from the above-recited application.

BACKGROUND

Conventional trucks are designed for specific transportation purposes, for example, short range delivery by a box truck, transporting and mixing concrete by a mixer truck, hauling large loads to large distances with Class 8 tractor trucks, and so on. The engine and transmission for a particular truck is selected based on its size, load limits, hauling distance requirements, and other requirements. When a truck is redesigned, or an existing truck is updated, the process starts essentially from scratch by selecting or designing chassis, engine, transmission, auxiliary components, cabin, and so on. These components are then arranged and integrated into a completed truck per customer requirements.

Figure 1:
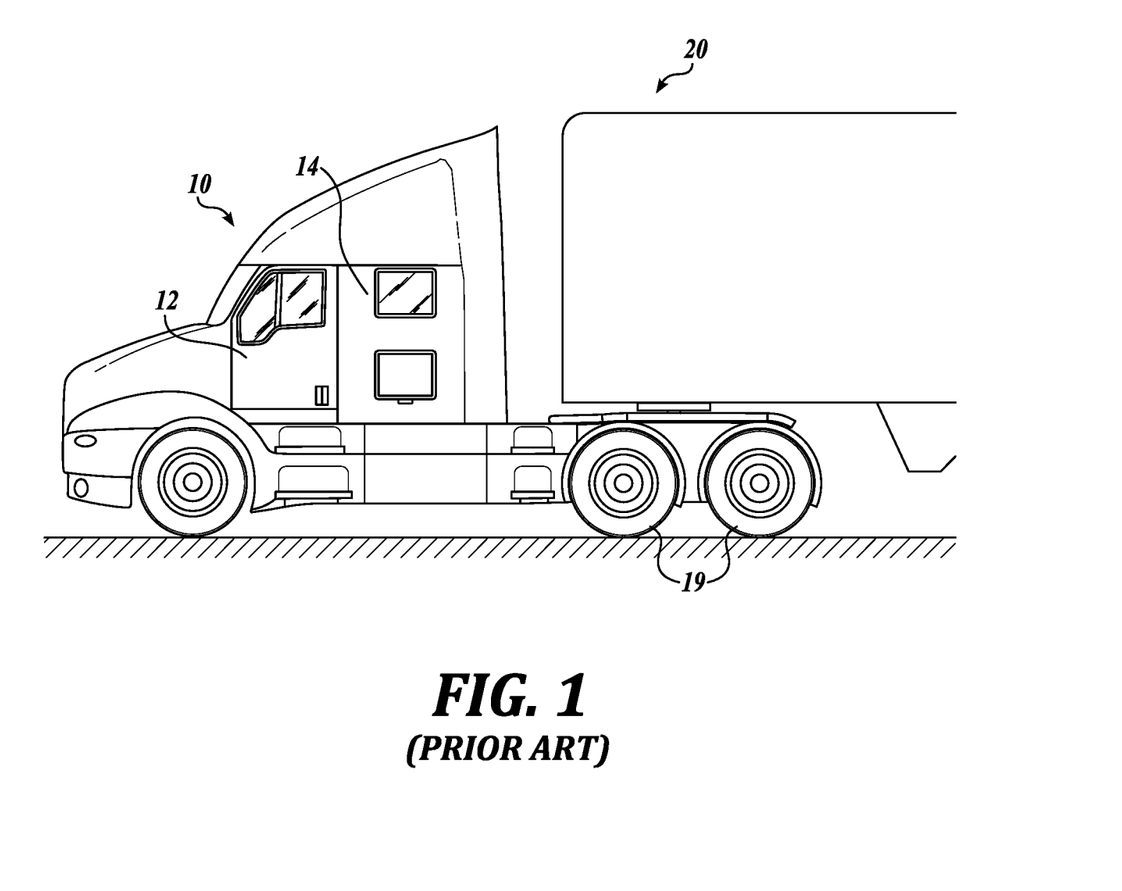
FIG. 1 is a side plan view of a truck in accordance with conventional technology.

FIG. 1 is a side plan view of a tractor-trailer combination in accordance with conventional technology. The tractor-trailer combination includes a tractor or truck 10 having a so-called fifth wheel by which a box-like semi-trailer 20 may be attached for transporting cargo. In operation, torque is transferred from the engine/transmission to rear wheels 19 to drive the truck/trailer combination. The illustrated truck 10 also includes a cab 12 and an attached sleeper 14.

Figure 2:
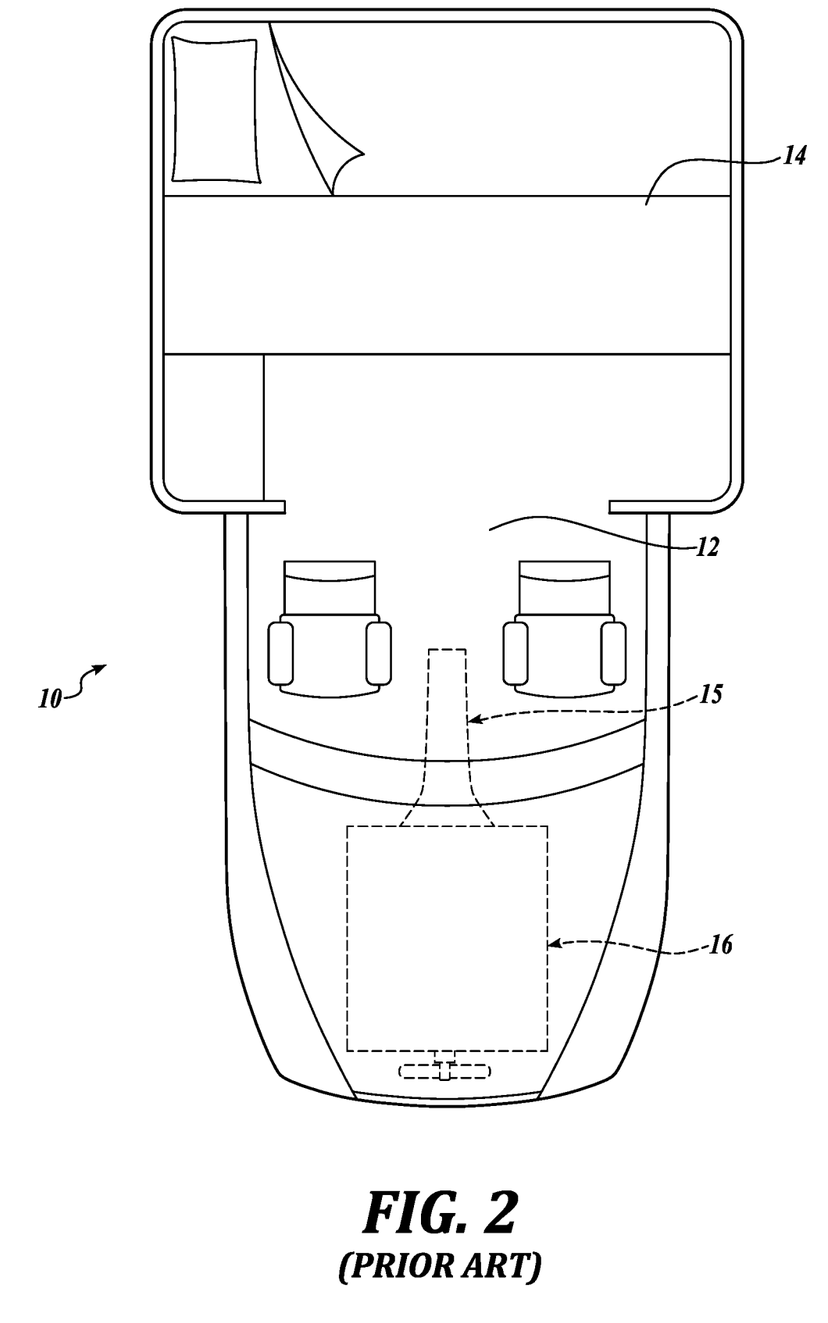
FIG. 2 is a top plan view of a truck in accordance with conventional technology.

FIG. 2 is a top view of the tractor 10 in accordance with an embodiment of the present technology. With the conventional tractor 10, the engine compartment houses an engine 16 that is coupled to a transmission 15 for transmitting power to the drive wheels (not shown). When a tractor is redesigned or a new tractor is designed from scratch, the space within the engine compartment (and other spaces within the chassis of the tractor) are rearranged and populated with the components of the tractor. For example, a new engine may be mated to a new transmission. Depending on the size of the new engine and transmission, other components will be arranged within the available space in the engine compartment and other spaces of the tractor.

Some more recent truck designs use hybrid power plants with an internal combustion engine and a stack of batteries. These trucks are generally more energy efficient under some use conditions (e.g., a stop-and-go driving). However, the design flow for hybrid trucks generally follows the established process of designing conventional trucks. That is, truck components (engine, batteries, transmission, auxiliary systems, etc.) are either selected or designed from scratch, and then arranged within a chassis (typically newly designed), with little or no design efficiency improvements or the corresponding cost savings.

Accordingly, there remains a need for cost- and space-effective truck designs that aim to address one or more problems of prior art systems.

SUMMARY

This summary is provided to introduce a selection of concepts in a simplified form that are further described below in the Detailed Description. This summary is not intended to identify key features of the claimed subject matter.

In one embodiment, a configurable modular vehicle includes: a chassis; a power plant module configured to generate electrical energy; and a drive train module. The drive train module includes: at least one traction motor configured to receive electrical energy from the power plant module, a transmission configured to transfer torque from the traction motor to a drive axle, and the drive axle configured to transfer torque to drive wheels. The configurable modular vehicle also includes a control system module configured to control components of the power plant module and the drive train module. Interfaces of the power plant module and the drive train module are predefined. Different types of the power plant modules and the drive train modules are interchangeable within their respective predefined interfaces.

In one aspect, the power plant module includes: an engine and a generator configured to receive the torque from the engine. The generator is electrically connected with the at least one traction motor of the drive train module. In one aspect, the power plant module further includes an engine gear box connected with the engine and the generator, where the engine gear box is configured to transfer torque from the engine to the generator.

In one aspect, the engine is selected from a group consisting of a diesel engine, a gas engine, a compressed gas engine, a gas turbine, and a fuel cell engine. In another aspect, the at least one traction motor is an electromotor electrically connected to a generator of the power plant module. In one aspect, the at least one traction motor is a first traction motor, and the configurable modular vehicle includes a second traction motor that is electrically connected to the generator of the power plant module.

In one aspect, the control system module includes rechargeable batteries. In another aspect, the at least one traction motor of the drive train module receives electrical energy at least in part from the rechargeable batteries. In one aspect, the power plant module includes an electrical charger configured to charge the rechargeable batteries. In another aspect, the control systems module includes an energy management controller configured to manage an accessory package, power electronics and the rechargeable batteries of the control systems module.

In one aspect, the configurable modular vehicle includes at least one support subsystems module having a fuel tank, an air compressor, at least one air tank, an exhaust subsystem, and an air intake subsystem. In another aspect, the control system module has predefined interfaces, and wherein different types of the control system modules are interchangeable within their predefined interfaces. In one aspect, the vehicle is a Class 8 truck.

In one embodiment, a method for designing a configurable modular vehicle includes: defining interfaces for a power plant module, a drive train module, and a control system module; defining elements of the power plant module, the drive train module, and the control system module; and interfacing the modules at their corresponding shared interfaces. The power plant module is configured to generate electrical energy and to provide electrical energy to the drive train module. The drive train module is configured to provide torque from at least one traction motor to a drive axle, and the control system module is configured to control components of the power plant module and the drive train module.

In one aspect, the power plant module is a first power plant module, and the method further includes replacing the first power plant module with a second power plant module, where the first power plant module and the second power plant module include different types of engines.

In one aspect, the power plant module comprises: an engine; an engine gear box connected with the engine; and a generator mechanically connected with the engine gear box and electrically connected with the at least one traction motor of the drive train module. The engine is selected from a group consisting of a diesel engine, a gas engine, a compressed gas engine, a gas turbine, and a fuel cell engine.

In one aspect, the drive train module includes: at least one traction motor connected to a transmission; the transmission configured to transfer torque from the traction motor to a drive axle; and the drive axle configured to transfer torque to drive wheels.

In another aspect, the control system module is configured to control components of the power plant module and the drive train module. In one aspect, the control system module includes rechargeable batteries. In one aspect, the power plant module includes an electrical charger configured to charge the rechargeable batteries. In another aspect, at least one traction motor of the drive train module receives electrical energy at least in part from the rechargeable batteries.

DESCRIPTION OF THE DRAWINGS

The foregoing aspects and many of the attendant advantages of the inventive technology will become more readily appreciated as the same are understood with reference to the following detailed description, when taken in conjunction with the accompanying drawings, wherein.

DETAILED DESCRIPTION

While several embodiments have been illustrated and described, it will be appreciated that various changes can be made therein without departing from the spirit and scope of the claimed subject matter. Briefly, the inventive technology is directed to a modular design of configurable vehicles, for example, trucks. In some embodiments, designated spaces are allocated to different components (modules) of the truck, for example, a power plant module, a drive train module, a control system module, and an auxiliary systems module. The interfaces between these modules may be defined and fixed from one truck design to another. For example, electrical power cables connecting an electromotor of the drive train module to a generator or batteries of the power plant module may have a predefined size and location for all subsequently designed modular trucks. Therefore, different drive train modules (e.g., diesel engine with an electrical generator, gas engine with an electrical generator, a bank of rechargeable batteries) can be deployed in different modularly designed trucks as a drop-in option without having to redesign the drive train module or to change its interface to other parts of the truck. When used to design commercial trucks, the modular design results in a configurable "plug and play" commercial truck that can use different combinations of power plants, drive trains, auxiliaries, number of drive wheels, and so on. Therefore, the design process is simplified and shortened, resulting in a less expensive truck that is faster to market.

Figure 3:
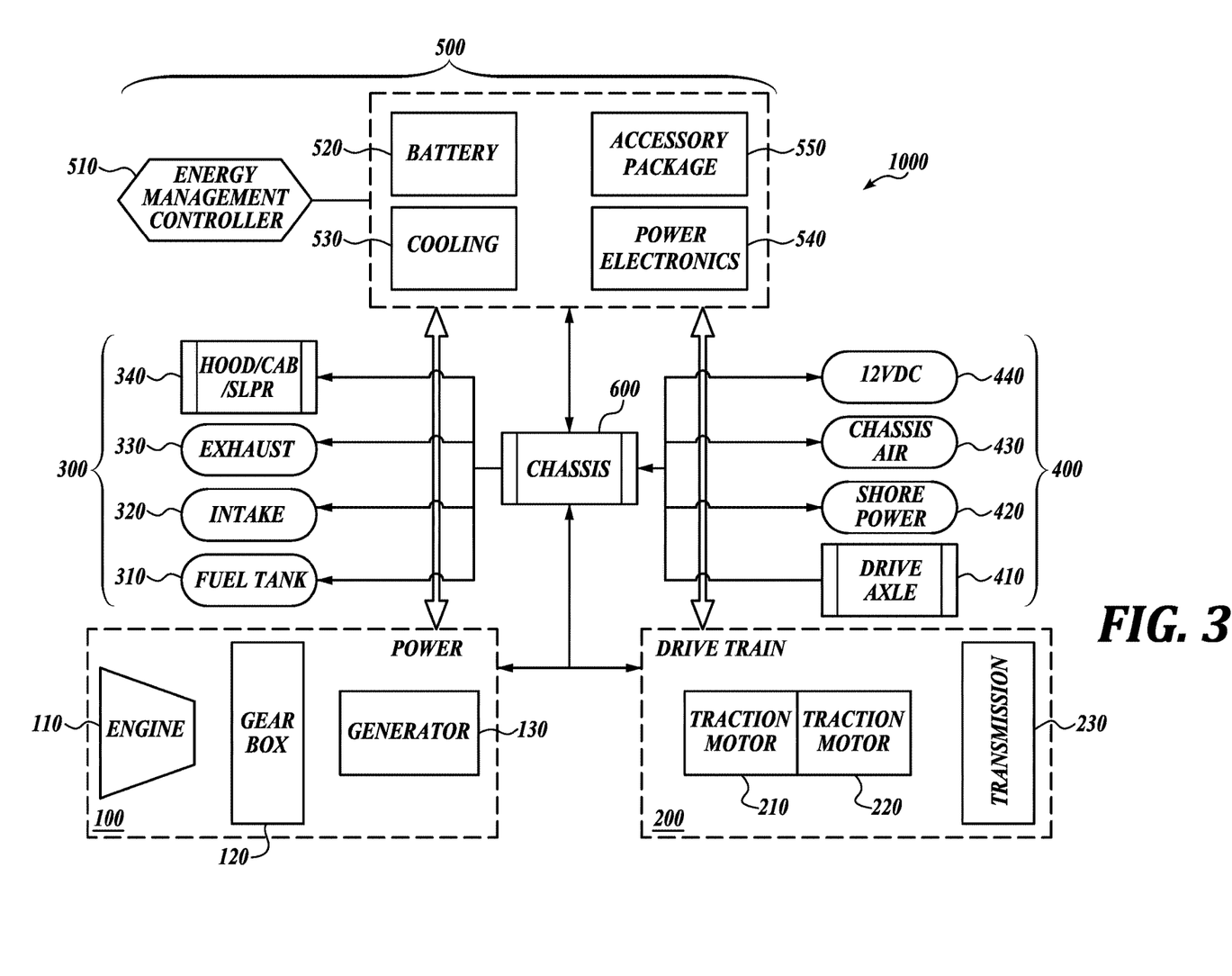
FIG. 3 is a schematic view of a modular vehicle design in accordance with an embodiment of the present technology.

FIG. 3 is a schematic view of a modular vehicle (e.g., truck or tractor) in accordance with an embodiment of the present technology. The illustrated modular vehicle includes several modules arranged around chassis 600: power plant module 100, a drive train module 200, support subsystem modules 300 and 400, and an energy module 500.

In some embodiments, the power plant module 100 includes an engine 110, an engine gearbox 120 and a generator 130. Some examples of the engine 110 include a diesel engine, a compressed gas engine, a fuel cell engine, a turbine, and a gas engine. In operation, the engine 110 generates torque that powers the engine gearbox 120 which adjusts rotations per minute (rpm) of its output axle to match the expected rpm at the input of a generator 130.

The drive train 200 may include one or more traction motors 210, 220 that receive electrical power from the generator 130. In some embodiments, the traction motors are electrical motors that provide torque to a transmission 230. When the design loads of the tractor change, the output torque of the transmission may be adjusted by changing a gear ratio of the transmission 230 while, for example, keeping the traction motors 210, 220 the same.

In some embodiments, the energy module 500 includes batteries 520, power electronics 540 and an accessory package 550. The batteries 520 may be charged by the generator 130 connected to a charger, or through a line voltage (not shown) when the truck is parked. In operation, the batteries 520 may at least partially energize the traction motors 210, 220, depending on the driving regime of the truck. A cooling subsystem 530 may control temperature of the batteries 520. Elements of the energy module 500 may be collectively controlled by an energy management controller 510 that includes, for example, a computer processor or a controller.

The support subsystems modules 300, 400 may include a fuel tank 310, an air intake 320 and an exhaust 330, which in operation provide fuel and air to the engine 110 and route the exhaust gases away from the engine. A drive axle 410 transfers torque from the transmission 230 to the drive wheels 19. In some embodiments, a shore power 420 receives a line voltage, transforms that voltage into a DC voltage, and feeds the DC voltage to the battery 520 (e.g., a high voltage battery for driving the traction motors) and/or a battery 440 (e.g., a 12 V DC for internal usage within the truck).

Many embodiments of the commercial trucks require compressed air for proper operation. In the illustrated modular truck 1000, compressed air is provided by unit 430 (e.g., a compressor and an air storage tank). The illustrated modular truck 1000 includes a cab or a cab/sleeper combination 340.

Figure 4:
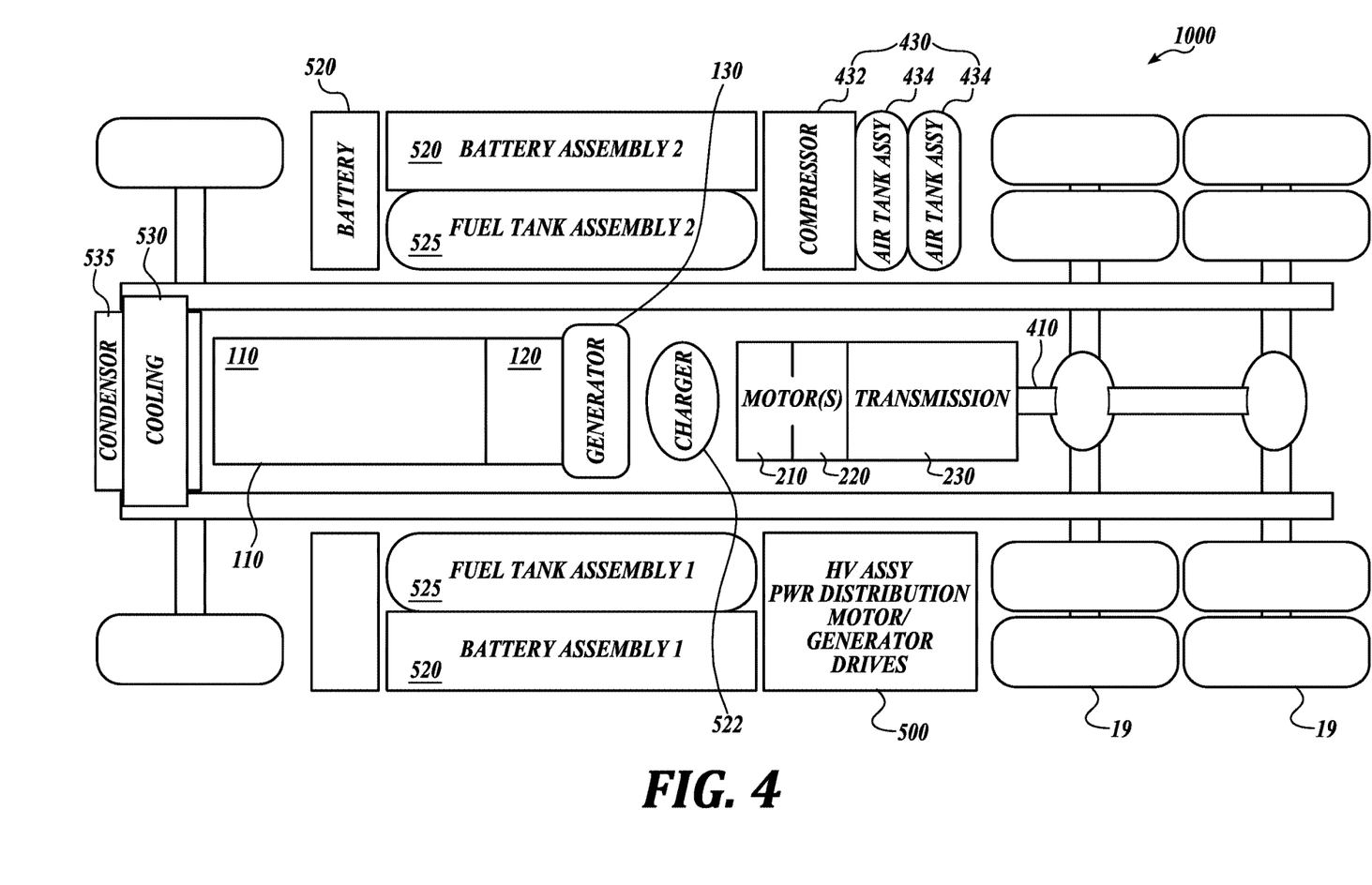
FIG. 4 is a schematic view of a modular vehicle layout in accordance with an embodiment of the present technology.

FIG. 4 is a schematic view of a modular vehicle layout with an embodiment of the present technology. In the illustrated embodiment, the elements of the power plant module (the engine 110, the engine gearbox 120 and the generator 130) and the drive train module (the motors 210, 220 and the transmission 230) are located centrally within the chassis and generally in line with the drive axle 410. A charger 522 may charge the battery 520 (also referred to as "rechargeable batteries" or "battery stacks") either using a line voltage or a voltage provided by the generator 130. In the illustrated embodiment, an engine cooling radiator 530 and an air conditioning condenser 535 are configured in front of the truck.

In different embodiments, different locations for the elements of the power plant module and the drive train module are also possible. For example, the drive train module may be located peripherally with respect to the chassis or generally parallel with the axles of the front wheels 18 and the rear wheels 19. However, the interface between the generator 130 and the traction motors 210, 220 remains fixed, such that energy is transferred from the generator 130 (or the generator 130 and the batteries 520) to the traction motors 210, 220 through electrical cables that are located at the interface between the two modules. Thus, with different designs of the modular trucks, the interface between the power plant module 100 and the drive train module 200 remains fixed or generally fixed (i.e., the location of the interface moves a relatively small percentage with respect to the signs of the engine of transmission, 5% or 10% or 15%). As a result, truck design and manufacturing is simplified even when, for example, different engines and transmissions are used in different trucks.

The illustrated modular truck 1000 includes battery stacks 520 for storing electrical energy and fuel tank assemblies 525 for storing fuel. With different modular designs, the space allocated to the battery stacks or the fuel tank assemblies (collectively, "energy storage assemblies") may be redistributed. For example, the space allocated to the battery stacks 520 may be increased for trucks that predominantly drive in the city, or the space allocated to the fuel tank assemblies 525 may be entirely re-allocated to the battery stacks 520 when the modular truck 1000 is entirely electrical. In general, the space allocated to these energy storage assemblies and their interfaces toward other modules remain the same or generally the same irrespective of the design of the truck.

In the illustrated embodiment, elements of the energy module 500 are located peripherally with respect to the chassis. In other embodiments, different locations of these and other modules possible for as long as the locations of these modules and their interfaces with other modules are predefined.

In some embodiments, a compressor 432 generates compressed air that is stored in one or more air tank assemblies 434. The compressor 432 may be powered from, for example, the truck battery 440.

Figure 5A:
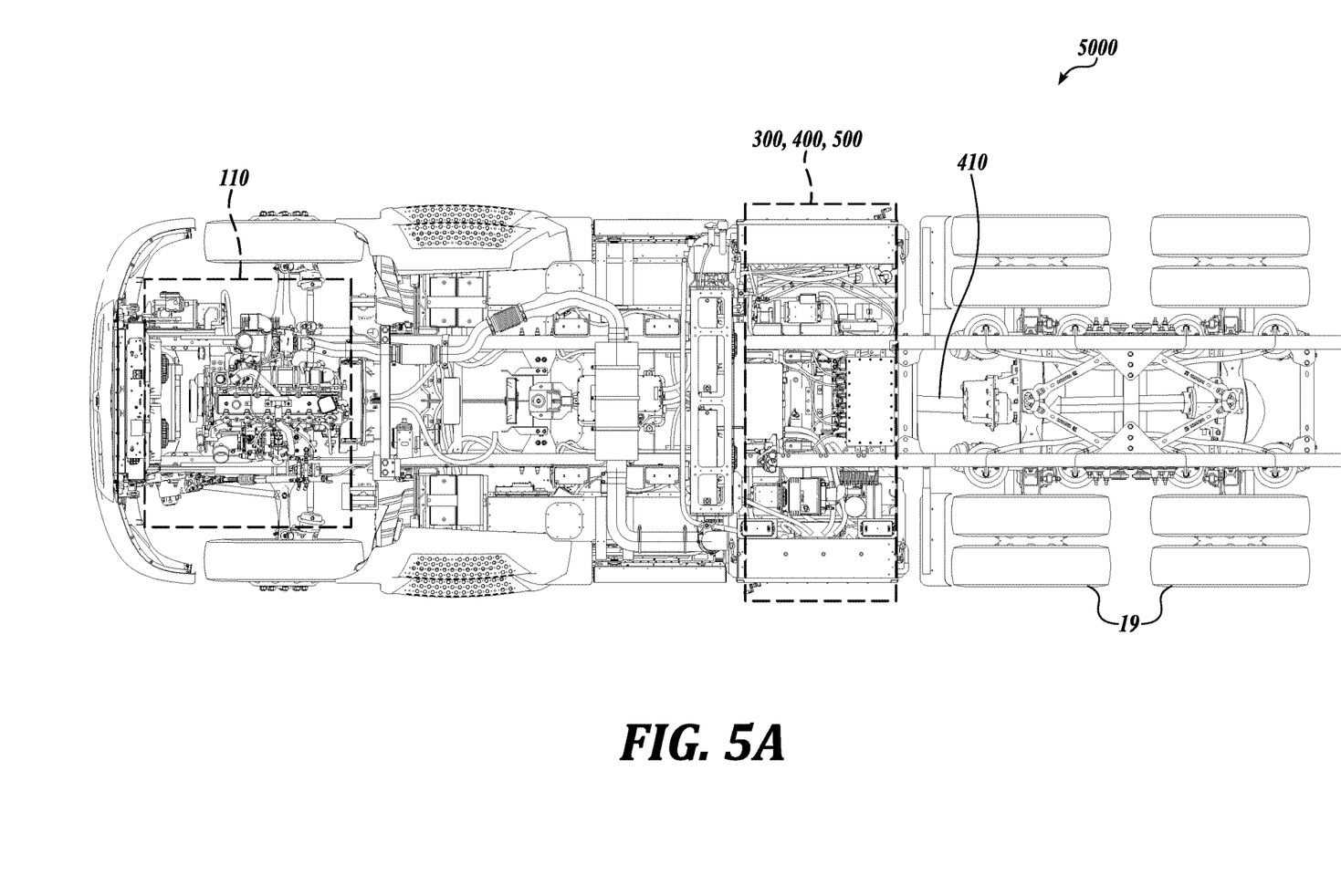
FIGS. 5A and 5B are respectively top and bottom views of a hybrid truck in accordance with an embodiment of the present technology.
Figure 5B:
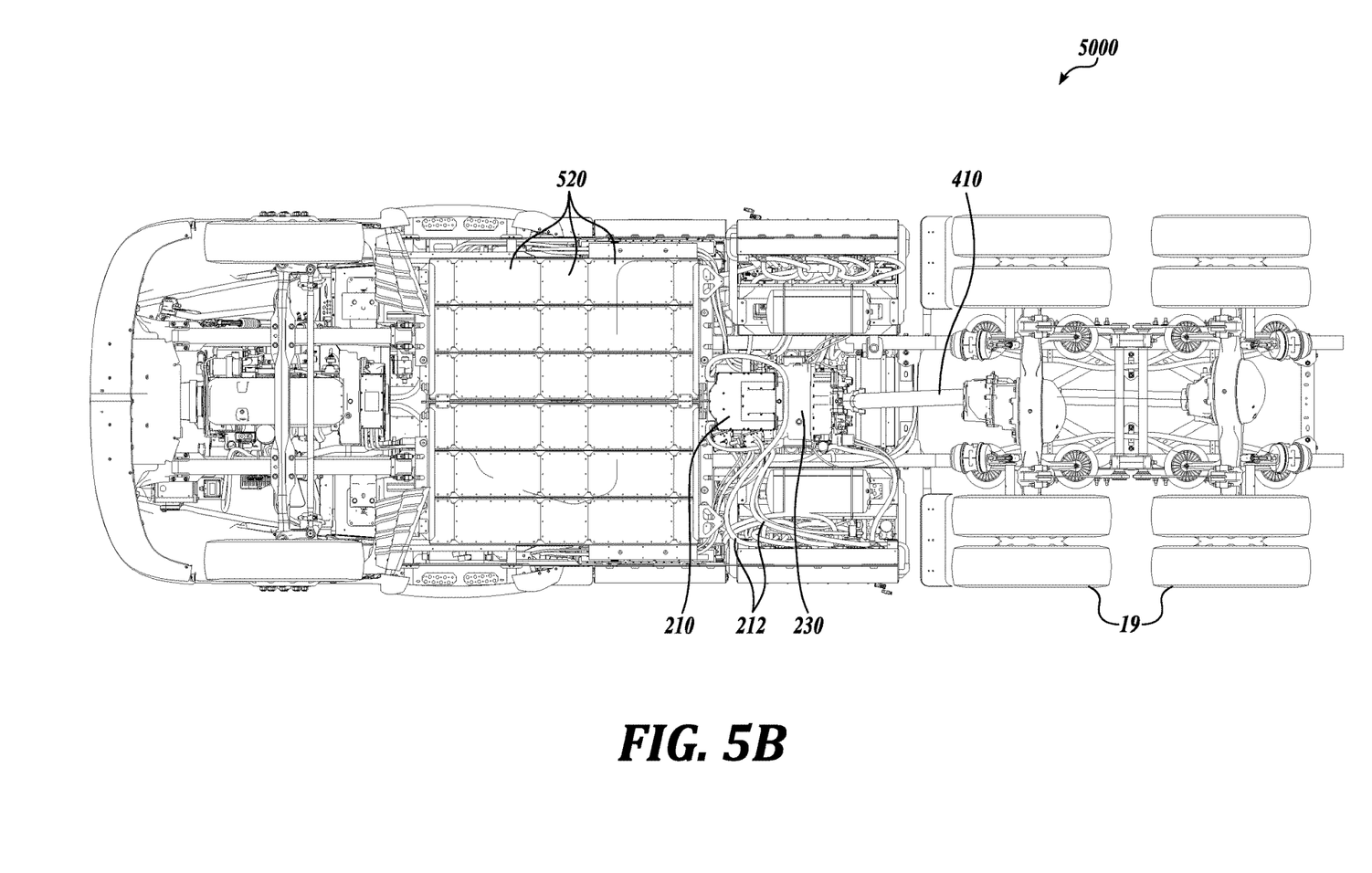

FIGS. 5A and 5B are respectively top and bottom views of a hybrid truck 5000 in accordance with an embodiment of the present technology. In these views, the cabin is removed to improve clarity of the views. The illustrated modular hybrid truck includes a compressed natural gas (CNG) engine 110 (FIG. 5A). The battery stacks 520 (FIG. 5B) may be at least partially charged by the engine 110. In operation, the engine 110 and the battery stacks 520 energize a traction motor 210 through electrical cables 212. The traction motor 210 provides torque to the transmission 230, which, in turn, rotates the drive axle 410 and the drive wheels 19.

As explained above, the engine 110 and the battery stacks 520 are located within their pre-defined spaces. Other modules and components of the truck (e.g., fuel tank, chassis air supply, etc.) may be laid out within analogously pre-defined spaces and interfaces. Therefore, in many embodiments of the modular truck, selection of different engines, transmission, battery stacks, etc., is simplified. An example of a modular truck that uses a different engine is discussed with respect to FIGS. 6A and 6B below.

Figure 6A:
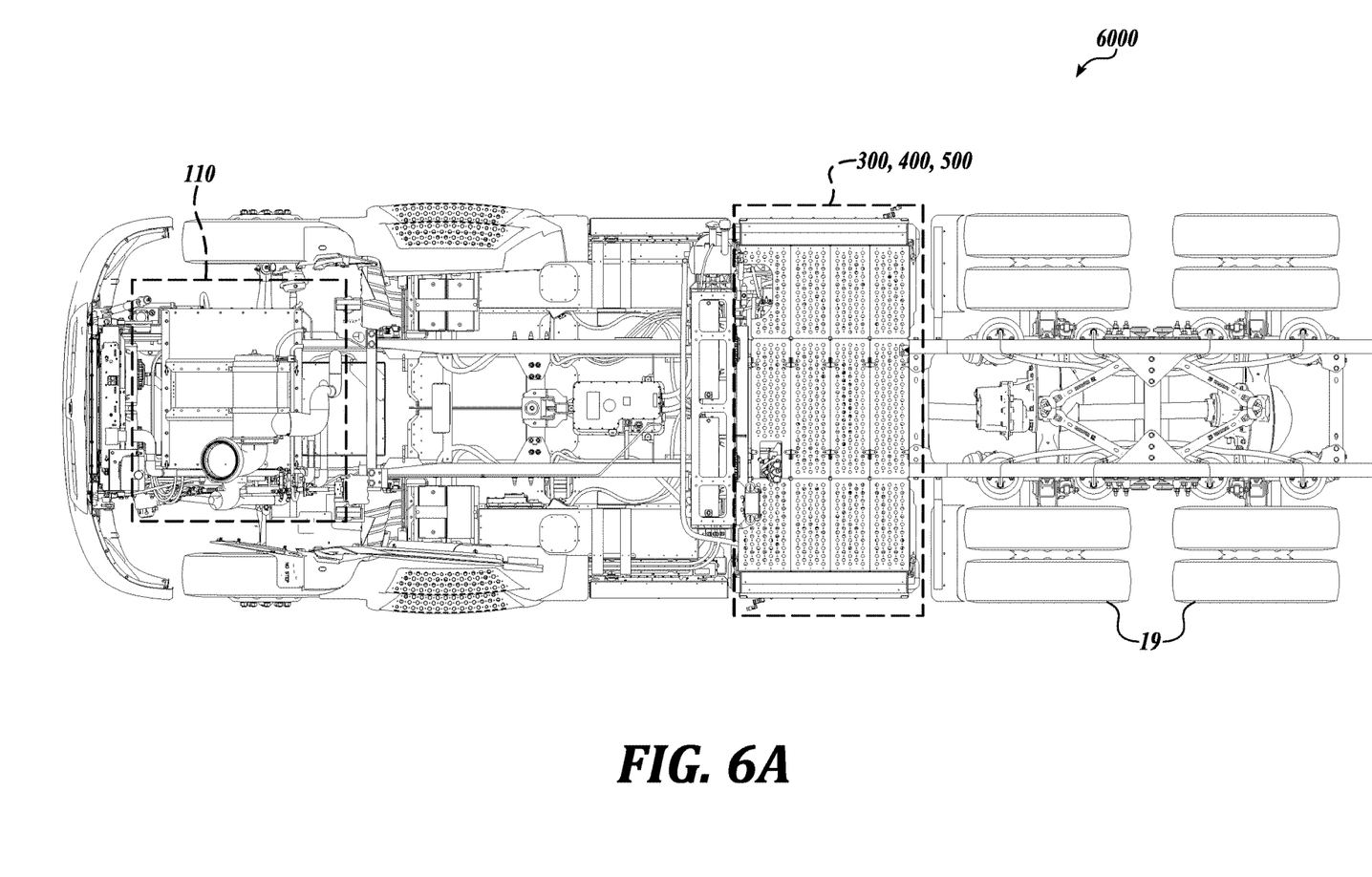
FIGS. 6A and 6B are respectively top and bottom views of a hybrid truck in accordance with an embodiment of the present technology.
Figure 6B:
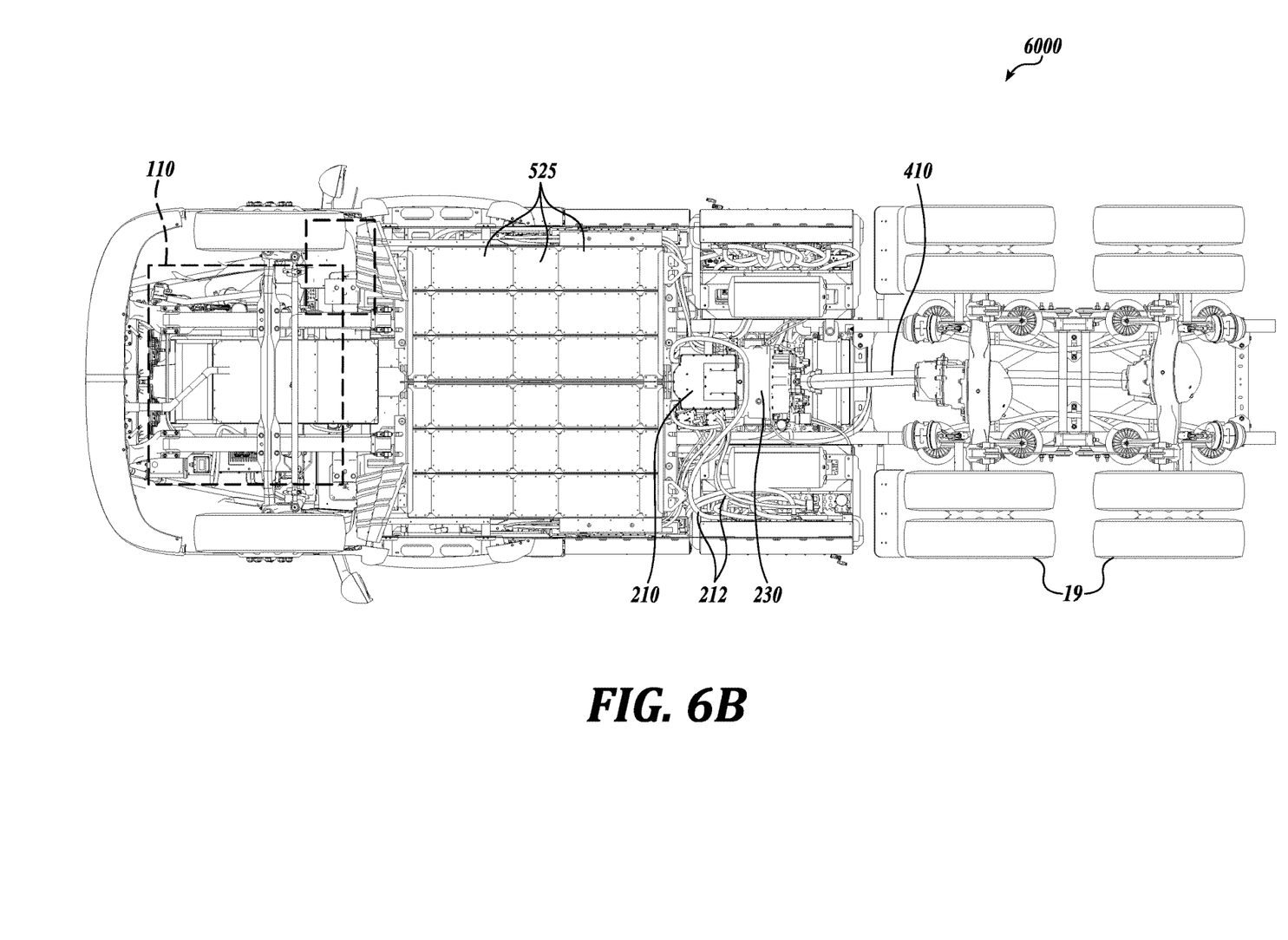

FIGS. 6A and 6B are respectively top and bottom views of a hybrid truck 6000 in accordance with an embodiment of the present technology. In the illustrated embodiment, the engine 110 (FIG. 6A) is a fuel cell engine. In operation, the engine 110 charges battery stacks 525 (FIG. 6B) and provides energy for the traction motor 210. Since the general location of the battery stacks 525, the electrical cables 212 (i.e., an interface to the traction motor 210), and other components of the truck remained the same, in at least some embodiments replacing the CNG engine of the modular truck 5000 with a fuel cell engine of the modular truck 6000 does not affect or minimally affects the overall design and manufacturability of the truck.

Many embodiments of the technology described above may take the form of computer-executable or controller-executable instructions, including routines executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. Of course, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. A configurable modular vehicle, comprising:
    a chassis;
    a first power plant module configured to generate electrical energy from a first fuel source;
    a control system module configured to control components of the first power plant module; and
    a control interface between the first power plant module and the control system module, wherein the control interface includes one or more electrical power cables and has a size and a location configured to accommodate a second power plant module that is configured to generate electrical energy from a second fuel source different from the first fuel source.

2. The configurable modular vehicle of claim 1, further comprising a drive train module comprising:
    at least one traction motor configured to receive electrical energy from the first power plant module;
    a transmission configured to transfer torque from the traction motor to a drive axle; and
    the drive axle configured to transfer torque to drive wheels,
    wherein different types of the drive train module are interchangeably included within the configurable modular vehicle without modification of a predefined interface of the drive train module.

3. The configurable modular vehicle of claim 2, wherein the first power plant module comprises:
  an engine; and
    a generator configured to receive the torque from the engine, wherein the generator is electrically connected with the at least one traction motor of the drive train module.

4. The configurable modular vehicle of claim 3, wherein the first power plant module further comprises an engine gear box connected with the engine and the generator, wherein the engine gear box is configured to transfer torque from the engine to the generator.

5. The configurable modular vehicle of claim 3, wherein the engine is selected from a group consisting of a diesel engine, a gas engine, a compressed gas engine, a gas turbine, and a fuel cell engine.

6. The configurable modular vehicle of claim 2, wherein the at least one traction motor is an electromotor electrically connected to a generator of the first power plant module.

7. The configurable modular vehicle of claim 2, wherein the at least one traction motor is a first traction motor, the configurable modular vehicle comprising a second traction motor electrically connected to the generator of the first power plant module.

8. The configurable modular vehicle of claim 2, wherein the control system module comprises rechargeable batteries.

9. The configurable modular vehicle of claim 8, wherein the at least one traction motor of the drive train module receives electrical energy at least in part from the rechargeable batteries.

10. The configurable modular vehicle of claim 8, wherein the first power plant module comprises an electrical charger configured to charge the rechargeable batteries.

11. The configurable modular vehicle of claim 8, wherein the control system module comprises an energy management controller configured to manage an accessory package, power electronics, and the rechargeable batteries of the control system module.

12. The configurable modular vehicle of claim 1, further comprising at least one support subsystems module that comprises a fuel tank, an air compressor, at least one air tank, an exhaust subsystem, and an air intake subsystem.

13. The configurable modular vehicle of claim 1, wherein different types of the control system module are interchangeably included within the configurable modular vehicle without modification of predefined interfaces of the control system module.

14. The configurable modular vehicle of claim 2, wherein the at least one traction motor and the transmission are positioned generally parallel with a rear axle of the vehicle.

15. A configurable modular vehicle, comprising:
  a chassis;
  a first power plant module configured to generate electrical energy from a first fuel source;
  a drive train module, the drive train module comprising:
    at least one traction motor configured to receive electrical energy from the first power plant module;
    a drive axle; and
    a transmission configured to transfer torque from the traction motor to the drive axle;
    wherein the drive axle is configured to transfer torque to drive wheels;
  a control system module configured to control components of the first power plant module;
  a control interface between the first power plant module and the control system module, wherein the control interface has a size and a location configured to accommodate a second power plant module that is configured to generate electrical energy from a second fuel source different from the first fuel source; and
  an electrical cable interface, wherein the electrical cable interface is configured to transfer energy from the first power plant module to the traction motor, wherein the electrical cable interface is configured to receive the second power plant module.

16. The configurable modular vehicle of claim 15, wherein the first power plant module comprises:
  an engine; and
    a generator configured to receive the torque from the engine, wherein the generator is electrically connected with the at least one traction motor of the drive train module.

17. The configurable modular vehicle of claim 16, wherein the first power plant module further comprises an engine gear box connected with the engine and the generator, wherein the engine gear box is configured to transfer torque from the engine to the generator.

18. The configurable modular vehicle of claim 16, wherein the engine is selected from a group consisting of a diesel engine, a gas engine, a compressed gas engine, a gas turbine, and a fuel cell engine.

19. The configurable modular vehicle of claim 15, wherein the at least one traction motor is a first traction motor, the configurable modular vehicle comprising a second traction motor electrically connected to the generator of the first power plant module.

20. The configurable modular vehicle of claim 15, wherein the at least one traction motor and the transmission are positioned generally parallel with a rear axle of the vehicle.

* * * * *